United States Patent
Telefus

(10) Patent No.: US 9,312,775 B2
(45) Date of Patent: Apr. 12, 2016

(54) RECONSTRUCTION PULSE SHAPE INTEGRITY IN FEEDBACK CONTROL ENVIRONMENT

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 6 days.

(21) Appl. No.: 13/865,010

(22) Filed: Apr. 17, 2013

(65) Prior Publication Data

US 2014/0204622 A1  Jul. 24, 2014

Related U.S. Application Data

(60) Provisional application No. 61/683,643, filed on Aug. 15, 2012, provisional application No. 61/793,099, filed on Mar. 15, 2013.

(51) Int. Cl.
*H02M 3/335* (2006.01)

(52) U.S. Cl.
CPC ...... *H02M 3/33523* (2013.01); *H02M 3/33576* (2013.01)

(58) Field of Classification Search
CPC ....... H02M 3/22; H02M 3/325; H02M 3/335; H02M 3/33507; H02M 3/33523; Y02B 70/1433; Y02B 70/1441
USPC .......... 363/21.02, 21.03, 21.12, 21.13, 21.15, 363/21.16
See application file for complete search history.

(56) References Cited

U.S. PATENT DOCUMENTS

| | | |
|---|---|---|
| 4,234,920 A | 11/1980 | Van Ness et al. |
| 4,273,406 A | 6/1981 | Okagami |
| 4,327,298 A | 4/1982 | Burgin |
| 4,370,703 A | 1/1983 | Risberg |
| 4,563,731 A | 1/1986 | Sato et al. |
| 4,611,289 A | 9/1986 | Coppola |
| 4,642,616 A | 2/1987 | Goodwin |
| 4,645,278 A | 2/1987 | Yevak et al. |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

EE Times.com-"Team Claims Midrange Wireless Energy Transfer", by R. Colin Johnson, 4 pages, Nov. 6, 2007.

(Continued)

*Primary Examiner* — Adolf Berhane
(74) *Attorney, Agent, or Firm* — Haverstock & Owens LLP

(57) ABSTRACT

A switched mode power converter includes a closed loop feedback control mechanism for regulating an output characteristic and a resonant type circuit for inclusion of resonant energy delivery. The characteristic impedance of the resonant type circuit is modified from an optimal energy transfer configuration to one that dampens fluctuations in a feedback signal used by the closed loop feedback mechanism. The modified characteristic impedance functions to dampen those fluctuations in the feedback signal resulting from leakage inductance energy provided by the resonant type circuit.

23 Claims, 7 Drawing Sheets

(56) References Cited

U.S. PATENT DOCUMENTS

| | | |
|---|---|---|
| 4,658,204 A | 4/1987 | Goodwin |
| 4,703,191 A | 10/1987 | Ferguson |
| 4,712,160 A | 12/1987 | Sato et al. |
| 4,742,424 A | 5/1988 | Kautzer et al. |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 4,985,804 A | 1/1991 | Campbell et al. |
| 5,065,302 A | 11/1991 | Kanazawa |
| 5,090,919 A | 2/1992 | Tsuji |
| 5,101,322 A | 3/1992 | Ghaem et al. |
| 5,105,182 A | 4/1992 | Shindo |
| 5,113,333 A * | 5/1992 | Ou .................................. 363/25 |
| 5,132,890 A | 7/1992 | Blandino |
| 5,235,491 A | 8/1993 | Weiss |
| 5,283,792 A | 2/1994 | Davies et al. |
| 5,325,283 A | 6/1994 | Farrington |
| 5,365,403 A | 11/1994 | Vinciarelli et al. |
| 5,373,432 A | 12/1994 | Vollin |
| 5,437,040 A | 7/1995 | Campbell et al. |
| 5,442,540 A | 8/1995 | Hua |
| 5,673,185 A | 9/1997 | Albach et al. |
| 5,712,772 A | 1/1998 | Telefus et al. |
| 5,717,936 A | 2/1998 | Uskali |
| 5,786,992 A | 7/1998 | Vinciarelli et al. |
| 5,790,395 A | 8/1998 | Hagen |
| 5,811,895 A | 9/1998 | Suzuki et al. |
| 5,838,171 A | 11/1998 | Davis |
| 5,838,554 A | 11/1998 | Lanni |
| 5,859,771 A | 1/1999 | Kniegl |
| 5,905,369 A | 5/1999 | Ishii et al. |
| 5,923,543 A | 7/1999 | Choi |
| 5,949,672 A | 9/1999 | Bertnet |
| 5,978,238 A | 11/1999 | Liu |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,205,752 B2 | 4/2007 | Jansen |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,564,706 B1 | 7/2009 | Herbert |
| 7,596,007 B2 | 9/2009 | Phadke |
| 7,701,305 B2 | 4/2010 | Lin et al. |
| 7,730,676 B2 | 6/2010 | Hon |
| 7,755,914 B2 | 7/2010 | Telefus et al. |
| 7,760,519 B2 | 7/2010 | Telefus et al. |
| 7,764,515 B2 * | 7/2010 | Jansen et al. ............... 363/21.02 |
| 7,830,684 B2 | 11/2010 | Taylor |
| 7,924,577 B2 * | 4/2011 | Jansen et al. ............... 363/21.02 |
| 7,924,578 B2 | 4/2011 | Jansen et al. |
| 7,978,489 B1 | 7/2011 | Telefus et al. |
| 8,040,117 B2 | 10/2011 | Telefus |
| 8,059,434 B2 | 11/2011 | Huang et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,193,662 B1 | 6/2012 | Carlson et al. |
| 8,194,417 B2 | 6/2012 | Chang |
| 8,207,717 B2 | 6/2012 | Uruno et al. |
| 8,243,472 B2 | 8/2012 | Chang et al. |
| 8,279,646 B1 | 10/2012 | Hamstra |
| 8,289,741 B2 | 10/2012 | Jungreis |
| 8,344,689 B2 | 1/2013 | Boguslavskij |
| 8,369,111 B2 | 2/2013 | Balakrishnan et al. |
| 8,400,801 B2 | 3/2013 | Shinoda |
| 8,441,810 B2 | 5/2013 | Telefus et al. |
| 8,488,340 B2 | 7/2013 | Zhang et al. |
| 8,520,410 B2 | 8/2013 | Telefus et al. |
| 8,654,553 B1 | 2/2014 | Ye et al. |
| 8,743,565 B2 * | 6/2014 | Telefus ...................... 363/21.02 |
| 2002/0008963 A1 | 1/2002 | Dibene et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0087784 A1 | 4/2007 | Yamamoto et al. |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2007/0298653 A1 | 12/2007 | Mahoney et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0196073 A1 | 8/2009 | Nakahori |
| 2009/0290384 A1 | 11/2009 | Jungreis |
| 2009/0300400 A1 | 12/2009 | DuBose |
| 2010/0039833 A1 | 2/2010 | Coulson et al. |
| 2010/0103711 A1 | 4/2010 | Komatsuzaki |
| 2010/0254057 A1 | 10/2010 | Chen |
| 2010/0289466 A1 | 11/2010 | Telefus et al. |
| 2010/0317216 A1 | 12/2010 | Pocrass |
| 2010/0322441 A1 | 12/2010 | Weiss et al. |
| 2010/0332857 A1 | 12/2010 | Vogman |
| 2011/0132899 A1 | 6/2011 | Shimomugi et al. |
| 2011/0222318 A1 | 9/2011 | Uno et al. |
| 2011/0261590 A1 | 10/2011 | Liu |
| 2012/0112657 A1 | 5/2012 | Van Der Veen et al. |
| 2012/0144183 A1 | 6/2012 | Heinrichs et al. |

(56) References Cited

U.S. PATENT DOCUMENTS

| | | | |
|---|---|---|---|
| 2012/0176818 A1* | 7/2012 | Gati | 363/21.07 |
| 2012/0262953 A1* | 10/2012 | Jungreis et al. | 363/17 |
| 2013/0155728 A1 | 6/2013 | Melanson | |
| 2013/0329469 A1 | 12/2013 | Kubota | |
| 2014/0029312 A1* | 1/2014 | Telefus | 363/21.02 |

FOREIGN PATENT DOCUMENTS

| | | |
|---|---|---|
| JP | 11202027 A | 7/1999 |
| JP | 2000083374 A | 3/2000 |
| JP | 20000253648 A | 9/2000 |
| JP | 2004208357 A | 7/2004 |

OTHER PUBLICATIONS

EE Times. com-"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

* cited by examiner

RECONSTRUCTION PULSE SHAPE INTEGRITY IN FEEDBACK CONTROL ENVIRONMENT

RELATED APPLICATIONS

This patent application claims priority under 35 U.S.C. 119 (e) of the U.S. Provisional Application Ser. No. 61/683,643, filed Aug. 15, 2012, and entitled "Reconstruction Pulse Shape Integrity in Feedback Environment and the Bidirectional Energy Conversion Architecture" and the U.S. Provisional Application Ser. No. 61/793,099, filed Mar. 15, 2013, and entitled "New Power Management Integrated Circuit Partitioning". This application incorporates U.S. Provisional Application Ser. No. 61/683,643 and U.S. Provisional Application Ser. No. 61/793,099 in their entireties by reference.

FIELD OF THE INVENTION

The present invention is generally directed to the field of power converters. More specifically, the present invention is directed to reconstruction pulse shape integrity in a power converter having feedback control.

BACKGROUND OF THE INVENTION

In many applications a power converter is required to provide a voltage within a predetermined range formed from a voltage source having a different voltage level. Some circuits are subject to uncertain and undesirable functioning and even irreparable damage if supplied power falls outside a certain range. More specifically, in some applications, a precise amount of power is required at known times. This is referred to as regulated power supply.

In order to control a power converter to deliver a precise amount of power as conditions require, some form of control of the power converter is required. This control can occur on the primary side of an isolation transformer or the secondary side. A closed loop feedback control system is a system that monitors some element in the circuit, such as the circuit output voltage, and its tendency to change, and regulates that element at a substantially constant value. Control on the secondary side of a power converter can use a monitored output voltage as feedback control, but requires the use of some communication from the secondary to the primary side of the isolation transformer to control the primary side switching element. Control on the primary side can readily control the primary side switching element, but requires some feedback mechanism from the secondary side to the primary side to convey the status of the monitored element. In some applications, an optical coupler circuit, or opto coupler, is used to transmit feedback signals while maintaining electrical isolation between the primary and secondary sides.

FIG. 1 illustrates a conventional regulated switch mode power converter including an optical coupler circuit. The power converter 2 is configured as a traditional flyback type converter. The power converter 2 includes an isolation transformer 4 having a primary winding P1 and a secondary winding S1. The primary winding P1 is electrically coupled to an input voltage Vin and a driving circuit including a transistor 8, a resistor 12, and a controller 10. A capacitor 28 is coupled across the input Vin and coupled with the primary winding P1. Input voltage to the circuit may be unregulated DC voltage derived from an AC supply after rectification and filtering. The transistor 8 is a fast-switching device, such as a MOSFET, the switching of which is controlled by the fast dynamic controller 10 to maintain a desired output voltage Vout. The controller 10 is coupled to the gate of the transistor 8 and provides a pulse width modulated (PWM) switching signal as the driving signal. As is well known, DC/DC conversion from the primary winding P1 to the secondary winding S1 is determined by the duty cycle of the PWM switching signal provided to the transistor 8. The secondary winding voltage is rectified and filtered using the diode 6 and the capacitor 22. A sensing circuit and a load 14 are coupled in parallel to the secondary winding S1 via the diode 6. The sensing circuit includes resistor 16, resistor 18, and a secondary controller 20. A secondary controller 20 senses the output voltage Vout across the load.

In this configuration, the power converter is controlled by driving circuitry on the primary side, and the load coupled to the output is isolated from the control. As such, a monitored output voltage used for voltage regulation is required as feedback from the secondary side to the control on the primary side. The power converter 2 has a voltage regulating circuit that includes the secondary controller 20 and an optical coupler circuit. The optical coupler circuit includes two galvanically isolated components, an optical diode 24 coupled to the secondary controller 20 and an optical transistor 26 coupled to the controller 10. The optical diode 24 provides optical communication with the optical transistor 26 across the isolation barrier formed by the transformer 4. The optical coupler circuit in cooperation with the secondary controller 20 provides feedback to the controller 10. The controller 10 accordingly adjusts the duty cycle of the transistor 8 to compensate for any variances in an output voltage Vout. The feedback provided to the controller 10 typically represents an error determined by the controller 20. A comparator within the controller 20 compares the output voltage Vout sensed when the transistor 8 is OFF to a reference voltage, the difference, or error, is provided as the feedback. The error is used to adjust the pulse width, or duty cycle, of the PWM switching signal provided to the transistor 8. If the sensed output voltage Vout is below the reference voltage, then the pulse width is increased to provide additional power to the output. If the sensed output voltage Vout is above the reference voltage, then the pulse width is decreased to reduce power to the output. The sign of the error determines whether the pulse width is increased or decrease, and the magnitude of the error determines by how much the pulse width is increased or decreased.

However, the use of an optical coupler circuit in and of itself presents issues. Firstly, the optical coupler circuit adds extra cost. In some applications, the optical coupler circuit can add more cost to the power converter than the isolation transformer. The optical coupler circuit also adds to manufacturing and testing costs. Furthermore, the performance of the optical coupler circuit degrades over time and therefore introduces another potential point of failure in the overall power converter. Also, characteristics of the optical coupler circuit must be accounted for in the overall circuit design. For example, the optical diode component is non-linear and as such a correlation between the optical diode and the optical transistor must be established. The optical coupler circuit also has delays related to the operation of the optical diode and the optical transistor, and the operation of the optical diode requires a well defined DC level. As a result, it is generally desirable to avoid the use of an optical coupler circuit.

A next generation of feedback control does not use optical control circuitry. Instead, the transformer is used to convey real-time feedback signaling from the secondary side to the primary side. In such an application, the transformer includes an auxiliary winding on the primary side that is magnetically coupled to the secondary winding. FIG. 2 illustrates a conventional regulated power converter including a magnetically coupled feedback circuit. The power converter 32 is configured as a traditional flyback type converter. The power converter 32 includes an isolation transformer 34 having a primary winding P1 and a secondary winding S1. The primary winding P1 is electrically coupled to an input voltage Vin and a driving circuit including a transistor 44, a resistor 46, and a controller 42. A capacitor 58 is coupled across the input Vin and coupled with the primary winding P1. Input voltage to the circuit may be unregulated DC voltage derived from an AC supply after rectification and filtering. Similar to the power converter in FIG. 1, the transistor 44 is a fast-switching device controlled by the fast dynamic controller 42 to maintain a desired output voltage Vout. The secondary winding voltage is rectified and filtered using the diode 36 and the capacitor 38, with the output voltage Vout delivered to the load 40.

The power converter 32 has a feedback loop that includes a magnetically coupled feedback circuit coupled to the secondary winding S1 of the transformer 34 and the controller 42. The magnetically coupled feedback circuit includes a diode 48, a capacitor 50, resistors 52 and 54 and an auxiliary winding 56. The auxiliary winding 56 is coupled in parallel to the series of resistors 52 and 54.

The auxiliary winding 56 is also magnetically coupled to the secondary winding S1. When the current through the diode 36 is zero, the voltage across the secondary winding S1 is equal to or proportional to the voltage across the auxiliary winding 56 depending on the turns ratio. The voltage divider formed by the resistors 52 and 54 can be configured to match the turns ratio of the secondary winding S1 and the auxiliary winding 56 so that the voltage across the secondary winding S1 equals the voltage VA. This relationship provides means for communicating the output voltage Vout as feedback to the primary side of the circuit. The voltage across the auxiliary winding 56 is measured when it is determined that the current through the diode 36 is zero, which provides a measure of the voltage across the secondary winding S1 and therefore the output voltage Vout.

The voltage VA is provided as a feedback voltage VFB to the controller 42. The current through the transistor 44 is also provided as feedback current IFB to the controller 42. The controller 42 includes a real-time waveform analyzer that analyzes input feedback signals, such as the feedback voltage VFB and the feedback current IFB. Similarly to the controller 10 in FIG. 1, the controller 42 uses the feedback signals to adjust a duty cycle of the PWM signal that drives the transistor 44.

In general, control intricacies of the controller 42 are aligned with control argument sampling to achieve overall system functional performance. Sampling argument is in the form of current, voltage and impedance. System functional performance is in the form of pulse width modulation (PWM), pulse frequency modulation (PFM) and pulse amplitude modulation (PAM). The feedback signal received by the controller 42 requires some status integrity, such as no noise on the DC level, no disturbance on the switching waveform and to some degree represent a combination of analog and digital representations. The voltage across the auxiliary winding 56 typically forms a pulse train with frequency corresponding to the switching frequency of the main transistor 44. The voltage across the auxiliary winding 56 when the secondary winding current is zero, which corresponds to the diode 36 current equaling zero, corresponds to the falling edge of the pulse. As such, measuring an accurate voltage value requires that the pulse is well defined with sufficient pulse integrity particularly at the falling edge. Further, the voltage value immediately following the rising edge includes ringing due to the leakage impedance of the transformer. As such, pulse integrity also requires sufficient time for the voltage value to stabilize following the rising edge. Higher switching frequencies minimize the pulse width and therefore provide less time for voltage stabilization. For at least these reasons, providing a pulse with sufficient pulse integrity is often difficult to achieve.

The topologies of the conventional regulated switch mode power converters shown in FIGS. 1 and 2 limit the efficiency due in part to switching losses, conduction losses, and leakage impedance losses. In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. Resonant switching techniques generally include an inductor-capacitor (LC) subcircuit in series with a semiconductor switch which, when turned ON, creates a resonating subcircuit within the converter. Further, timing the ON/OFF control cycles of the resonant switch to correspond with particular voltage and current conditions across respective converter components during the switching cycle allows for switching under zero voltage and/or zero current conditions. Zero voltage switching (ZVS) and/or zero current switching (ZCS) inherently reduces or eliminates many frequency related switching losses.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic.

Several power converter topologies have been developed utilizing resonant switching techniques, for example the co-owned U.S. Pat. No. 7,764,515 entitled "Two Terminals Quasi Resonant Tank Circuit," to Jansen et al. (Jansen), which is hereby incorporated in its entirety by reference. Jansen is directed to a flyback type converter including a quasi-resonant tank circuit. FIG. 3 illustrates the flyback type converter of Jansen. The quasi-resonant flyback converter 60 includes a conventional flyback converter including a transformer 62, a transistor 72, a controller 70, a diode 64, a capacitor 66, and a load 68 with the addition of a quasi-resonant tank circuit formed by a transistor 76, diodes 78, 80 and 82, and capacitors 84 and 86. When the transistor 72 is turned ON, the transistor 76 is turned OFF, and the primary winding of the transformer 62 is connected to the input supply voltage such that the input supply voltage appears across the primary winding, resulting in an increase of magnetic flux in the transformer 62 and the primary winding current rises linearly. No current flows through the secondary winding of the transformer 62 because the diode 64 is reverse biased. When the transistor 72 is turned OFF, the transistor 76 turns ON parametrically, without control of a separate control circuit. The diodes 78, 80 and 82 and the capacitor 86 function as driving circuitry for the transistor 76. With the transistor 76 turned ON, the capacitor 84 is essentially coupled in parallel to the transformer 62, and the energy previously stored in the primary winding causes current to circulate in the circuit formed by the capacitor 84 and the primary winding, forming a resonant tank. As with a conventional flyback converter, energy stored in the primary winding is delivered to the load while the transistor 72 is turned OFF. However, in the quasi-resonant flyback converter 60 of FIG. 3, a portion of the resonant energy generated in the resonant tank is also delivered to the load while the transistor 72 is turned OFF and the transistor 76 is turned ON. In this manner, the quasi-resonant flyback converter 60 of FIG. 3 delivers peak energy equal to energy from the typical flyback operation plus the resonant energy. However, current flow within the resonant tank cycles between positive and negative current flow through the primary winding. The configuration of the secondary side circuit, in particular the diode 64, only allows delivery of resonant energy during one direction of primary winding current flow. Resonant energy corresponding to the other direction of primary current flow is not delivered.

In addition to providing an increase in peak energy, the quasi-resonant flyback converter of FIG. 3 provides the conventional advantages associated with a resonant circuit, such as reduced frequency dependent losses and EMI.

SUMMARY OF THE INVENTION

Embodiments of a switched mode power converter are directed to a closed loop feedback control mechanism for regulating an output characteristic and to a resonant type circuit for inclusion of resonant energy delivery. The characteristic impedance of the resonant type circuit is modified from an optimal energy transfer configuration to one that dampens fluctuations in a feedback signal used by the closed loop feedback mechanism. The modified characteristic impedance functions to dampen those fluctuations in the feedback signal resulting from leakage inductance energy provided by the resonant type circuit.

In an aspect, a method of controlling a switching mode power converter is disclosed. The method includes configuring a switching mode power converter to include a transformer, an output circuit coupled to a secondary winding of the transformer, a main switch coupled to a primary winding of the transformer, a controller coupled to the main switch, a feedback circuit including an auxiliary winding magnetically coupled to the secondary winding, and a resonant type circuit coupled to the primary winding to form a resonant tank. The method also includes configuring the resonant tank to have a characteristic impedance that dampens fluctuations in a feedback signal received from the output circuit by the controller via the auxiliary winding. The method also includes generating a driving signal according to the received feedback signal, and driving the main switch using the driving signal to regulate an output characteristic.

The feedback signal can be a voltage signal that is proportional in value to an output voltage of the power converter. The output characteristic can be one or more of an output voltage, an output current, and an output power of the power converter. Dampening fluctuations in the feedback signal can improve a pulse shape integrity of the feedback signal. The dampened fluctuations can be those fluctuations resulting from leakage inductance energy provided by the resonant tank. Configuring the switching mode power converter can also include configuring the resonant type circuit to include an auxiliary switch coupled in parallel to the primary winding such that when the auxiliary switch is turned ON the resonant tank is established. Configuring the switching mode power converter can also include configuring the resonant type circuit to include a driving circuit coupled to the auxiliary switch, wherein the driving circuit is parametrically driven by a voltage condition across the primary winding of the transformer. The characteristic impedance of the resonant tank can be configured to dampen fluctuations in the feedback signal by adjusting a capacitance ratio within the resonant type circuit so as to reduce an amount of resonant energy delivered to the output circuit. The characteristic impedance of the resonant tank can be configured to dampen fluctuations in the feedback signal by adding a resistive element within the resonant tank so as to reduce an amount of resonant energy delivered to the output circuit. The method can also include transmitting the feedback voltage signal from the output circuit to the first controller via the auxiliary winding.

In another aspect, a switching mode power converter is disclosed. The power converter includes a transformer, a switch, a controller, a feedback circuit, and a resonant type circuit. The transformer has a primary winding coupled to an input supply voltage and a secondary winding. The switch is coupled in series to the primary winding. The controller is coupled to the switch. The feedback circuit includes an auxiliary winding magnetically coupled to the secondary winding to receive a feedback signal. The feedback circuit is coupled to the controller to provide the feedback signal. The resonant type circuit is coupled to the primary winding to form a resonant tank. The transformer and the resonant type circuit are configured such that the resonant tank has a characteristic impedance that dampens fluctuations in the feedback signal.

The feedback signal can be a voltage signal that is proportional in value to an output voltage of the power converter. The output characteristic can be one or more of an output voltage, an output current, and an output power of the power converter. The dampened fluctuations can be those fluctuations resulting from leakage inductance energy provided by the resonant tank. The resonant type circuit can include an auxiliary switch coupled in parallel to the primary winding such that when the auxiliary switch is turned ON the resonant tank is established. The resonant type circuit can also include a driving circuit coupled to the auxiliary switch of the resonant tank, wherein the driving circuit is parametrically driven to turn ON and OFF the auxiliary switch by a voltage condition across the primary winding of the transformer. The auxiliary switch can be a transistor. The resonant type circuit can include a pair of capacitors configured with a capacitance ratio that achieves the characteristic impedance. The capacitance ratio can be 1:1. The resonant type circuit can include a resistive element included within the resonant tank that achieves the characteristic impedance. The transformer can be configured to transmit the feedback signal from the secondary winding to the auxiliary winding. The switch can be a transistor.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 4:
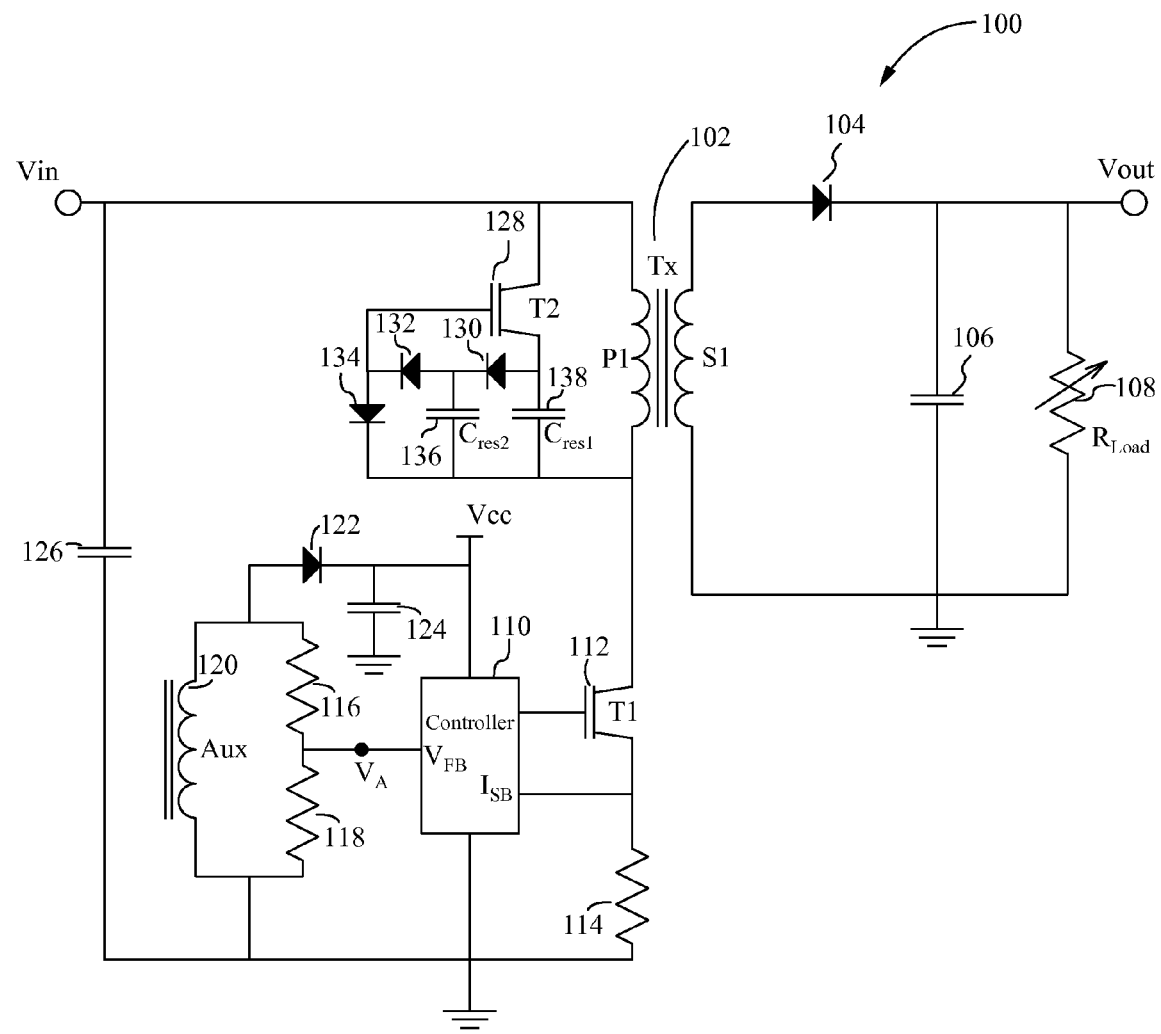
FIG. 4 illustrates a power converter according to an embodiment.

FIG. 4 illustrates a power converter according to an embodiment. The power converter 100 is configured to receive an unregulated DC voltage signal at an input node Vin and to provide a regulated output voltage Vout. Input voltage to the circuit may be unregulated DC voltage derived from an AC supply after rectification. The input voltage is typically filtered, such as via capacitor 126.

The power converter 100 includes power conversion and resonant circuitry. In some embodiments, the power converter 100 is configured as a flyback converter. It is understood that the concepts described herein can be applied to alternatively configured switched mode converters including, but not limed to, a forward converter, a push-pull converter, a half-bridge converter, and a full-bridge converter. Additionally, the power converter 100 includes a resonant tank and is configured to delivery resonant energy to a load. The power converter 100 includes a primary switch 112, an auxiliary switch 128, a controller 110, a transformer 102, and a capacitor 138. The primary switch 112 is coupled in series with a primary winding P1 of the transformer 102. The auxiliary switch 128 is coupled in series with the capacitor 138, and the serially coupled auxiliary switch 128 and capacitor 138 are coupled in parallel to the primary winding P1 of the transformer 102.

The primary switch 112 and the auxiliary switch 128 are each a suitable switching device. In an exemplary embodiment, the primary switch 112 and the auxiliary switch 128 are each a n-type metal-oxide-semiconductor field-effect transistor (MOSFET) device. Alternatively, any other semiconductor switching device known to a person of skill in the art can be substituted for the primary switch 112 and/or the auxiliary switch 128. The primary switch 112 is controlled by the controller 110. In some embodiments, the controller 110 includes a pulse width modulation (PWM) circuit. The controller 110 regulates the duty cycle of the primary switch 112 with the PWM circuit. The controller 110 can sense voltage and/or current conditions within the circuit, such as the voltage and/or current across the sense resistor 114. The controller 110 can include a current comparator circuit (not shown) to use with a current feedback circuit (not shown) in regulating the duty cycle of the primary switch 112. Likewise, the controller 110 can include a voltage comparator circuit (not shown) to use with a voltage feedback circuit (not shown) in regulating the duty cycle of the primary switch 112.

The power converter 100 further includes output circuitry coupled to a secondary winding S1 of the transformer 102. The output circuitry includes a rectifier diode 104 and an output capacitor 106. An anode of the rectifier diode 104 is coupled to a first terminal of the secondary winding S1. A cathode of the rectifier diode 104 is coupled to a first terminal of the output capacitor 106 and coupled to the output node Vout. The output capacitor 106 is coupled to the output node Vout across an output load, represented by a resistor 108.

The power converter 100 also includes driving circuitry for the auxiliary switch 128. In some embodiments, the driving circuitry for the auxiliary switch 128 is configured such that when the voltage across the primary winding P1 of the transformer 102 is higher than zero, the auxiliary switch 128 will be in the ON state. The driving circuitry is further configured such that when the voltage across the primary winding P1 of the transformer 102 is equal or lower than zero, the auxiliary switch 128 will be in the OFF state.

Where the controller 110 employs force commutation for turning ON and OFF of the primary switch 112, adaptive self-commutation is used for switching the auxiliary switch 128 ON and OFF. In an exemplary embodiment, the driving circuitry for the auxiliary switch 128 is implemented using a diode 130, a diode 132, a diode 134, and a capacitor 136, as shown in FIG. 4. In an exemplary method of operating the driving circuitry of FIG. 4, at the moment that the rising edge of the voltage across the primary winding P1 of the transformer 102 reaches zero, the body diode of the auxiliary switch 128 starts conducting. Also, diode 132 starts conducting at this point and starts charging the gate-to-source parasitic capacitance of the auxiliary switch 128 through the capacitor 136. The further rising voltage across the capacitor 138 is divided by the capacitor 136 and the addition of the gate-to-source parasitic capacitance and the gate-to-drain parasitic capacitance of the auxiliary switch 128.

When the voltage across the gate-to-source parasitic capacitance of the auxiliary switch 128 reaches the threshold voltage of the auxiliary switch 128, the auxiliary switch 128 will turn ON. It is important that the ratio between the voltage across capacitor 138 and the maximum voltage on the gate of the auxiliary switch 128 is chosen to stay within the safe operating area of the auxiliary switch 128. The ratio can be dimensioned with the value of the capacitor 136. The gate voltage of the auxiliary switch 128 will remain substantially the same until the voltage across the capacitor 138 has reduced to the same level of the gate voltage. When the voltage across the capacitor 138 further reduces, the diode 134 starts conducting and will pull the gate voltage of the auxiliary switch 128 down until it reaches the gate threshold voltage at which point the auxiliary switch 128 turns OFF. Diodes 130, 132, and 134 further prohibit the voltage across the capacitor 138 to go significantly below zero. It is understood that alternatively configured driving circuits and alternative methods for operating the driving circuit to parametrically turn the auxiliary switch ON and OFF can be implemented.

A resonant circuit is formed by the capacitors 138 and 136, the diodes 130, 132, and 134, the auxiliary switch 128 having the body diode and parasitic capacitances, and the primary winding P1 of the transformer 102. When the auxiliary switch 128 is turned ON and the primary switch 112 is turned OFF, the capacitors 138 and 136 and the primary winding P1 of the transformer 102 form a resonant tank. The turn-on voltage value for the auxiliary switch 128 can depend on the capacitance chosen for the capacitors 138 and 136. In this manner, the auxiliary switch 128 is parametrically controlled to turn ON and OFF without direct control of a separate control circuit.

FIG. 4 shows a single inductance element, the primary winding P1 of the transformer 42. The primary winding P1 conceptually represents both a magnetizing inductance element and a leakage inductance element.

The power converter 100 has a feedback loop that includes a magnetically coupled feedback circuit coupled to the secondary winding S1 of the transformer 102 and the controller 110. The magnetically coupled feedback circuit includes a diode 122, a capacitor 124, resistors 116 and 118, and an auxiliary winding 120. The auxiliary winding 120 is coupled in parallel to the series of resistors 116 and 118. The auxiliary winding 120 is also magnetically coupled to the secondary winding S1. When the current through the diode 104 is zero, the output voltage Vout is equal to the voltage across the secondary winding S1, and the voltage across the secondary winding S1 is equal to the voltage across the auxiliary winding 120 if the turns ratio is 1:1, or otherwise proportional depending on the turns ratio. This relationship provides means for communicating the voltage across the secondary winding S1, and therefore the output voltage Vout, as feedback to the primary side of the circuit.

The auxiliary winding 120 is magnetically coupled to the secondary winding S1, and the voltage across the auxiliary winding 120 is equal to or proportional to the voltage across the secondary winding S1 when the current through the diode 104 is zero. As such, the output voltage Vout is transmitted from across the isolation galvanic barrier via the magnetically coupled auxiliary winding 120 and secondary winding S1.

The voltage across the auxiliary winding 120 is measured when the transistor 112 is OFF and the current through the diode 104 equals zero. The voltage VA is proportional to the voltage across the auxiliary winding 120 and therefore represents the output voltage Vout. The voltage VA is provided as a feedback voltage VFB to the controller 110, wherein the feedback voltage VFB represents the output voltage Vout.

The controller 110 is configured to receive the feedback voltage FB. The current through the transistor 106 is also provided as feedback current IFB to the controller 110. In some embodiments, the controller 110 includes a real-time waveform analyzer that analyzes input feedback signals, such as the feedback voltage VFB and the feedback current IFB. In general, control intricacies of the waveform analyzer are aligned with control argument sampling to achieve overall system functional performance. Sampling argument is in the form of current, voltage and impedance. System functional performance is in the form of pulse width modulation (PWM), pulse frequency modulation (PFM) and pulse amplitude modulation (PAM). The controller 110 determines the output voltage Vout according to the feedback signals and generates a driving signal for controlling the primary switch 112 and regulating the output voltage Vout.

Figure 2:
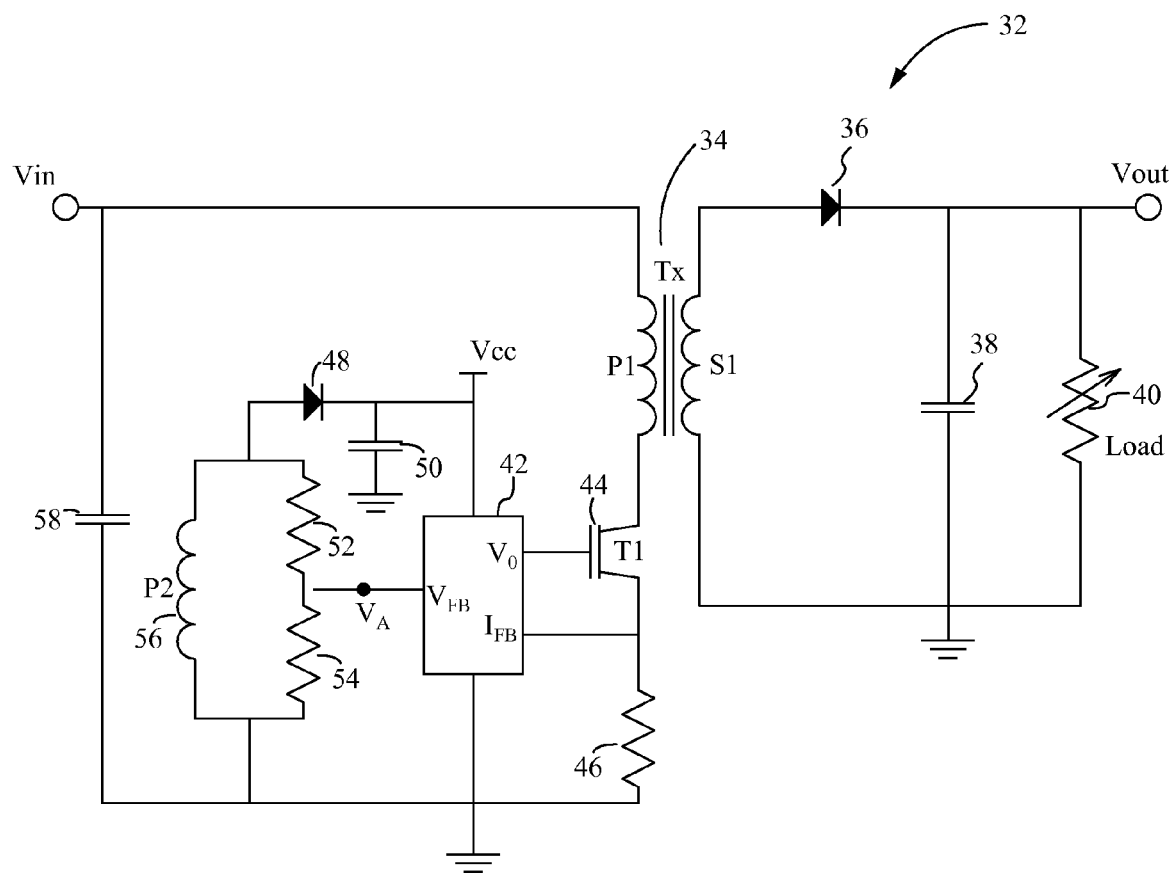
FIG. 2 illustrates a conventional regulated power converter including a magnetically coupled feedback circuit.
Figure 3:
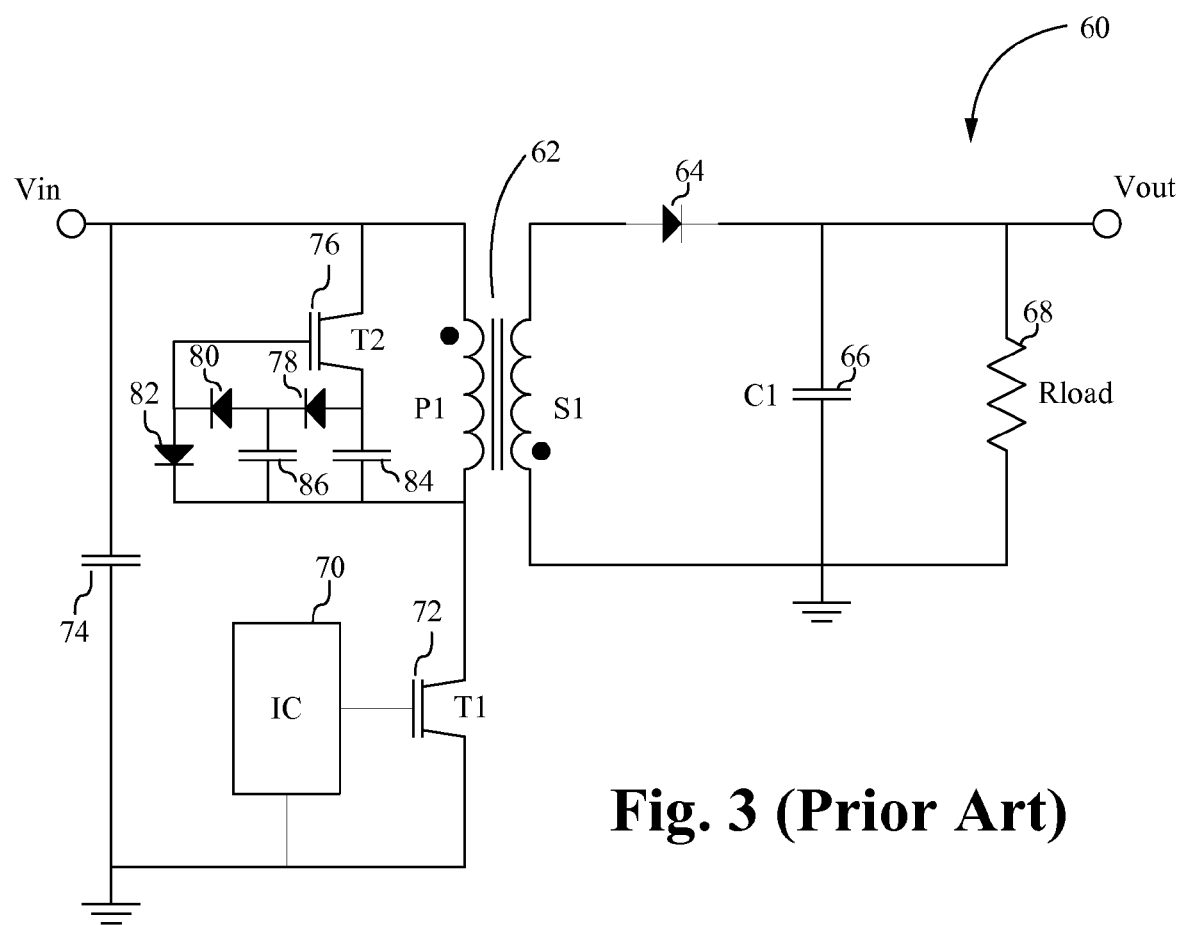
FIG. 3 illustrates the flyback type converter of Jansen.

In some embodiments, the resonant circuit is configured for optimal energy transfer by maximizing the amount of resonant energy delivered to the load. In conventional power converters, such as the power converter 32 in FIG. 2, power delivered to the load is provided in the form of magnetizing inductance energy stored in the transformer. However, inclusion of the resonant circuit adds a power delivery element that includes resonance energy provided in the form of leakage inductance energy stored in the resonant tank. The amount of resonant energy delivered to the load can be maximized through proper configuration of the resonant circuit. As applied to the power converter 100 of FIG. 4, optimal energy transfer is achieved by optimizing the values of the capacitors 138 and 136. The capacitor 138 primarily functions as energy storage within the resonant tank and therefore is fundamental in determining the amount of resonant energy transfer. The capacitor 136 primarily functions as a driving element for the auxiliary switch 128. Optimizing energy transfer corresponds to selecting a capacitance for capacitor 138 that is significantly greater than the capacitance for capacitor 136, resulting in a ratio of capacitor 138 to capacitor 136 that is much greater than one.

Figure 1:
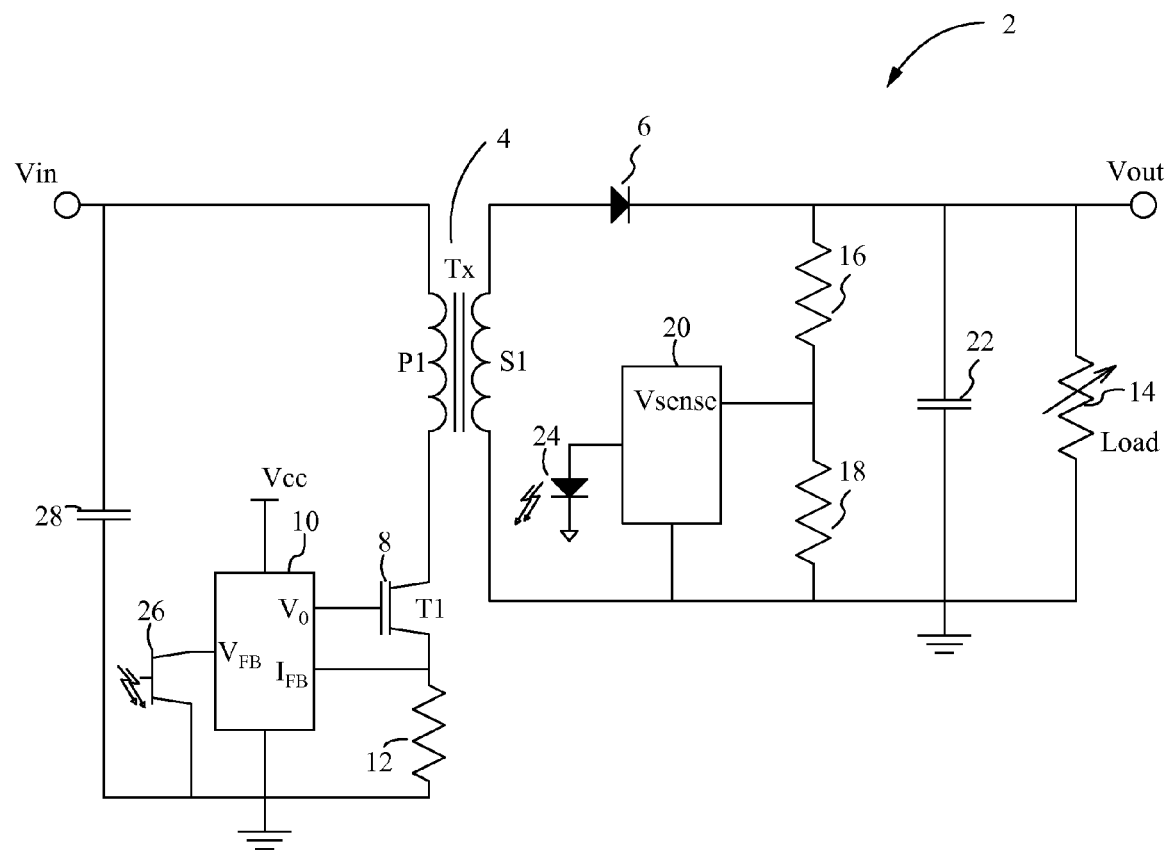
FIG. 1 illustrates a conventional regulated switch mode power converter including an optical coupler circuit.
Figure 5:
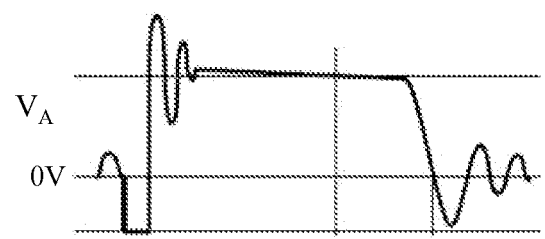
FIG. 5 illustrates exemplary voltage and current waveforms corresponding to the conventional power converter 32 of FIG. 2.
Figure 5:
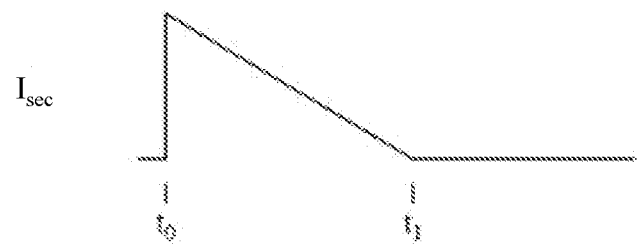

However, regulation of the output voltage Vout requires sufficient pulse integrity of the voltage VA analyzed by the controller. In the conventional power converter 32 of FIG. 1, the voltage VA shows decreasing fluctuations as the secondary current Isec through the secondary winding S1 decreases linearly toward zero. FIG. 5 illustrates exemplary voltage and current waveforms corresponding to the conventional power converter 32 of FIG. 2. At time t0, the switch 44 turns OFF, and the secondary current Isec decreases linearly, eventually reaching zero at time t1. The voltage value VA is measured at time t1, when the secondary current Isec equals zero, such that the measured voltage VA corresponds to the output voltage Vout. As described above, achieving an accurate value of voltage VA when the secondary current Isec equals zero is dependent on the pulse integrity.

Figure 6:
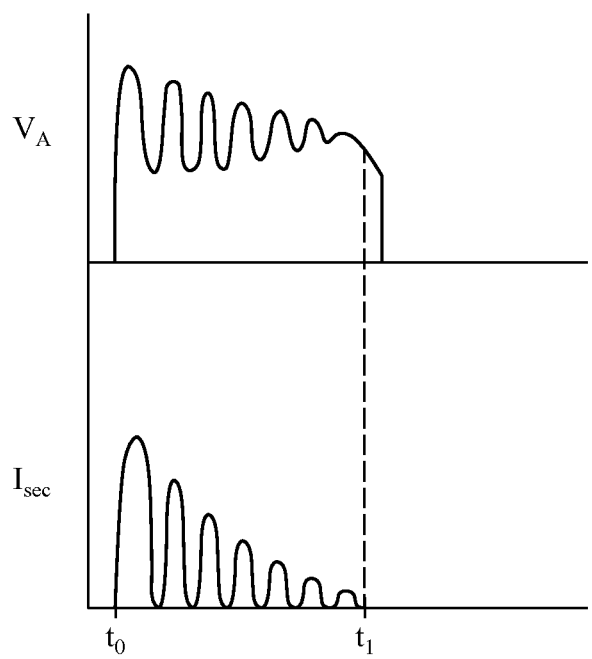
FIG. 6 illustrates exemplary voltage and current waveforms corresponding to the power converter of FIG. 4 configured for optimal energy transfer.

Configuring the power converter 100 of FIG. 4 to maximize resonant energy transfer results in voltage and current waveforms different than those shown in FIG. 5. FIG. 6 illustrates exemplary voltage and current waveforms corresponding to the power converter of FIG. 4 configured for optimal resonant energy transfer. As shown in FIG. 6, the secondary current Isec through the secondary winding S1 is no longer linear. The secondary current Isec is derived from the leakage inductance in the transformer 102 when the primary switch 112 is OFF. The resonant energy derived from the leakage inductance results in the secondary current Isec fluctuating up and down on a downward trend. The fluctuating value of the secondary current Isec inhibits stabilization of the voltage VA even as the secondary current Isec trends toward zero. As such, the pulse integrity suffers and it is difficult to determine an accurate measure of the voltage VA when the secondary current Isec equals zero.

Figure 7:
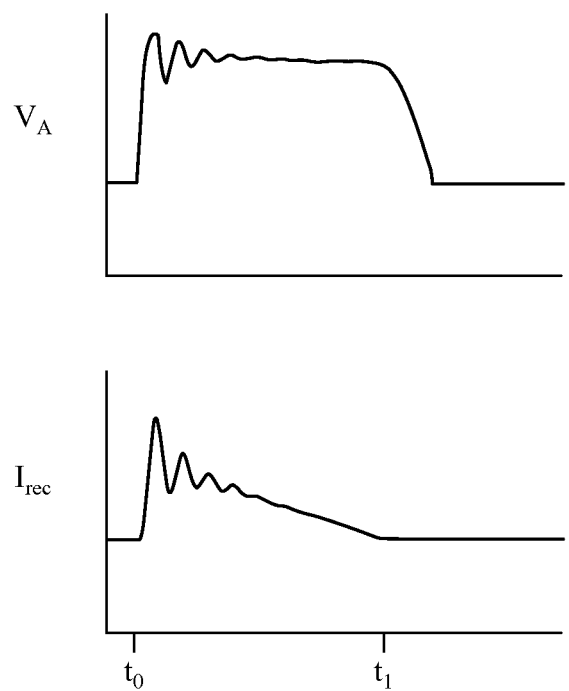
FIG. 7 illustrates exemplary voltage and current waveforms corresponding to the power converter of FIG. 4 configured to include a dampening factor.

To establish improved pulse integrity and better stabilize the voltage VA, the resonant tank is modified by implementing dampening elements that function to dampen the voltage fluctuations in the voltage VA. An objective to is to generate a voltage VA pulse having a back end that is substantially linear, optimally flat. To achieve the improved pulse integrity, the characteristic impedance of the resonant tank is modified. With such a configuration, there is a willingness to compromise power delivery performance by introducing characteristic impedance to increase a dampening factor of the voltage VA. In other words, the energy transfer is compromised to establish integrity of the voltage VA pulse for control purposes. Dampening results in reduced fluctuations of the voltage VA and quicker flattening of the pulse back end. FIG. 7 illustrates exemplary voltage and current waveforms corresponding to the power converter of FIG. 4 configured to include a dampening factor. As shown in FIG. 7, the secondary current Isec through the secondary winding S1 begins by fluctuating up and down on a downward trend but then transitions to nearly a downward sloping line. In general, power delivered by a power converter is a combination of energy delivered from the resonant tank, referred to as leakage inductance energy, and energy stored in the transformer as magnetizing inductance, referred to as magnetizing inductance energy. When the resonant tank is configured for optimal energy transfer, most of the power delivered is via leakage inductance energy, which corresponds to the oscillating secondary current Isec in FIG. 6. Only the last minor portion of the secondary current Isec waveform in FIG. 6 is linearly decreasing, which corresponds to power delivery via magnetizing inductance energy. In contrast, when impedance is introduced into the resonant tank, less power is delivered as leakage inductance energy, which corresponds to the oscillating front end portion of the secondary current Isec waveform in FIG. 7, and more power is delivered as magnetizing inductance energy, which corresponds to the linear back end portion of the secondary current Isec waveform in FIG. 7. As such, introducing dampening elements into the resonant tank changes the energy delivery characteristics of the power converter 100.

In some embodiments, the characteristic impedance of the resonant tank is modified by changing the values of the resonant capacitors 136 and 138 relative to the values used for optimized resonant energy transfer. Changing the capacitance ratio of the capacitor 138 to the capacitor 136 adds impedance to the resonant tank, which dampens the ringing of the voltage VA, flattens the back end of the voltage pulse and produces an improved pulse integrity, thereby enabling regulation control. When configured for optimal resonant energy transfer, the value of the capacitor 138 is much greater an the value of the capacitor 136. To introduce impedance into the resonant tank, the values of the capacitors 138 and 136 are made much closer to each other, in some cases being equal. Additionally, the values of both capacitors 138 and 136 are made smaller than those values used in the optimal resonant energy transfer configuration.

Figure 8:
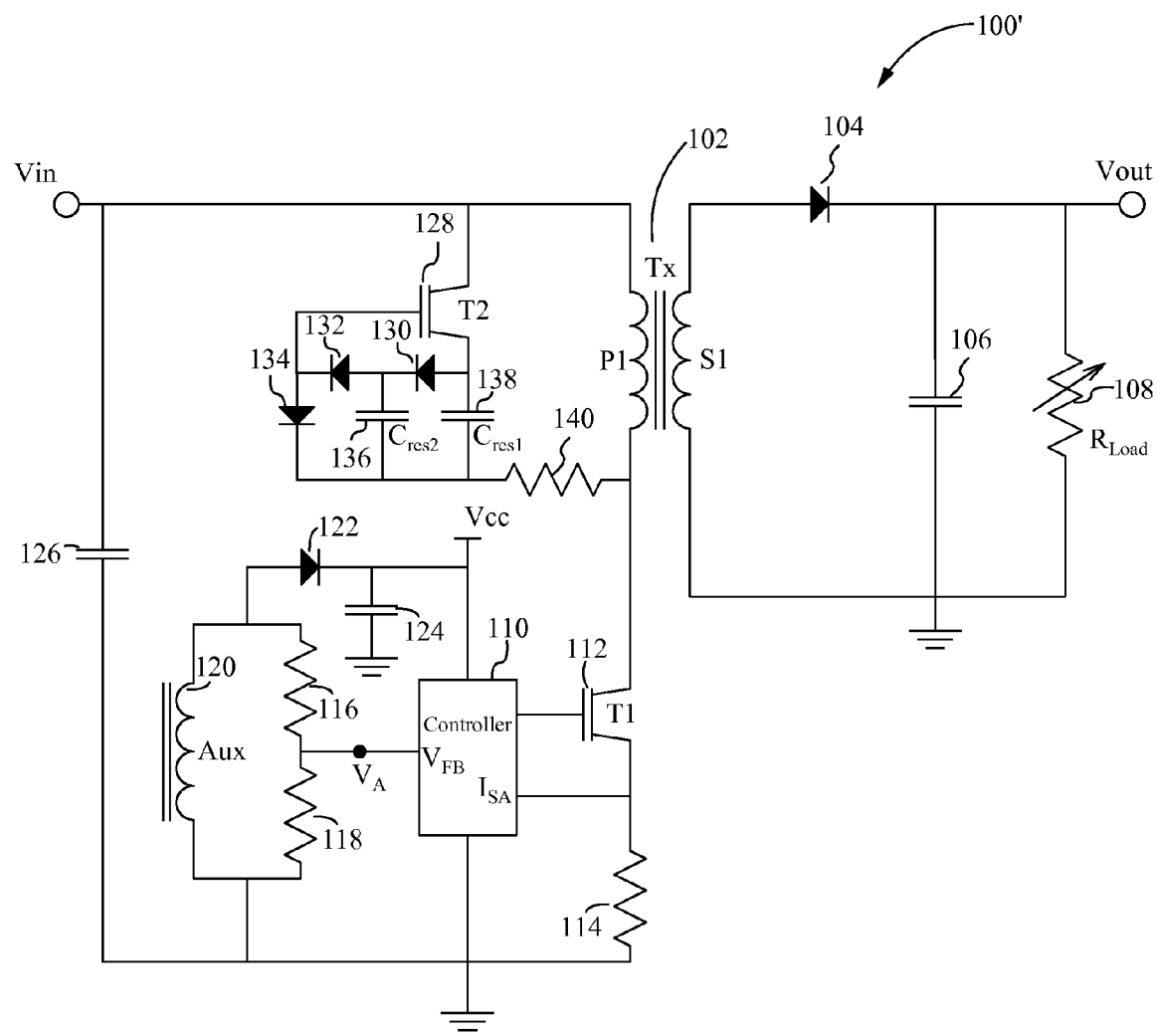
FIG. 8 illustrates a power converter according to another embodiment.

In other embodiments, the characteristic impedance of the resonant tank is modified by adding a resistive element. FIG. 8 illustrates a power converter according to another embodiment. The power converter 100' of FIG. 8 is similar to that of the power converter 100 of FIG. 4 with the inclusion of a resistor 140 in the resonant tank. The resistive element can be added to the existing optimized energy transfer configuration, or the resistive element can be added in addition to also changing the capacitive values in the resonant tank. In the latter technique, the capacitive values may not need to be changed as much as if only the capacitive elements in the resonant tank are changed to add impedance, as the resistive element accounts for a portion of the desired added impedance. The added resistor 140 can represent one or more discrete resistive elements, or the resistor 140 can generally represent an added impedance within the resonant tank, for example an impedance added to the transformer.

In operation, a circuit output characteristic is transmitted from the secondary side of a switching mode power converter to a primary side controller for regulation purposes. In an exemplary application, the circuit output characteristic is the output voltage Vout. In some embodiments, the output voltage Vout is transmitted from the secondary winding a magnetically coupled auxiliary winding on the primary side of the power converter. The auxiliary winding is coupled to the primary side controller. The controller receives the transmitted output voltage Vout from the auxiliary winding as feedback voltage and uses the feedback voltage to generate a driving signal for controlling the primary transistor and regulating the output voltage Vout. The power converter includes a resonant circuit coupled to the primary winding to increase energy transfer efficiency. The resonant circuit includes a resonant tank configured to dampen fluctuations of the feedback voltage and establish voltage pulse integrity for regulating control.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling a switching mode power converter comprising:
   a. configuring a switching mode power converter comprising a transformer, an output circuit coupled to a secondary winding of the transformer, a main switch coupled to a primary winding of the transformer, a controller coupled to the main switch, a feedback circuit including an auxiliary winding magnetically coupled to the secondary winding, and a resonant type circuit coupled to the primary winding to form a resonant tank, wherein the resonant type circuit comprises a pair of capacitors configured with a capacitance ratio and a resistive element, further wherein the resonant type circuit further comprises a shape generating circuit configured to shape the feedback signal to have a back end that is substantially linear;
   b. configuring the capacitance ratio and the resistive element in the resonant tank to have a characteristic impedance that dampens fluctuations in a feedback signal received from the output circuit by the controller via the auxiliary winding and shapes the feedback signal to have the back end that is substantially linear; and
   c. generating a driving signal according to the received feedback signal; and
   d. driving the main switch using the driving signal to regulate an output characteristic.

2. The method of claim 1 wherein the feedback signal is a voltage signal that is proportional in value to an output voltage of the power converter.

3. The method of claim 1 wherein the output characteristic is one or more of an output voltage, an output current, and an output power of the power converter.

4. The method of claim 1 wherein dampening fluctuations in the feedback signal improves a pulse shape integrity of the feedback signal.

5. The method of claim 1 wherein the dampened fluctuations are those fluctuations resulting from leakage inductance energy provided by the resonant tank.

6. The method of claim 1 wherein configuring the switching mode power converter further comprises configuring the resonant type circuit to include an auxiliary switch coupled in parallel to the primary winding such that when the auxiliary switch is turned ON the resonant tank is established.

7. The method of claim 6 wherein configuring the switching mode power converter further comprises configuring the resonant type circuit to include a driving circuit coupled to the auxiliary switch, wherein the driving circuit is parametrically driven by a voltage condition across the primary winding of the transformer.

8. The method of claim 1 wherein the characteristic impedance of the resonant tank is configured to dampen fluctuations in the feedback signal by adjusting a capacitance ratio within the resonant type circuit so as to reduce an amount of resonant energy delivered to the output circuit.

9. The method of claim 1 wherein the characteristic impedance of the resonant tank is configured to dampen fluctuations in the feedback signal by adding a resistive element within the resonant tank so as to reduce an amount of resonant energy delivered to the output circuit.

10. The method of claim 1 further comprising transmitting the feedback voltage signal from the output circuit to the first controller via the auxiliary winding.

11. A switching mode power converter comprising:
   a. a transformer having a primary winding coupled to an input supply voltage and a secondary winding;
   b. a switch coupled in series to the primary winding;
   c. a controller coupled to the switch;
   d. a feedback circuit including an auxiliary winding magnetically coupled to the secondary winding to receive a feedback signal, wherein the feedback circuit is coupled to the controller to provide the feedback signal; and
   e. a resonant type circuit coupled to the primary winding to form a resonant tank, wherein the transformer and the resonant type circuit are configured such that the resonant tank has a characteristic impedance that dampens fluctuations in the feedback signal, further wherein the resonant type circuit comprises a pair of capacitors configured with a capacitance ratio and a resistive element included within the resonant tank, wherein the capacitance ratio and the resistive element are configured to achieve the characteristic impedance, further wherein the resonant type circuit further comprises a shape generating circuit configured to shape the feedback signal to have a back end that is substantially linear.

12. The power converter of claim 11 wherein the feedback signal is a voltage signal that is proportional in value to an output voltage of the power converter.

13. The power converter of claim 11 wherein the output characteristic is one or more of an output voltage, an output current, and an output power of the power converter.

14. The power converter of claim 11 wherein the dampened fluctuations are those fluctuations resulting from leakage inductance energy provided by the resonant tank.

15. The power converter of claim 11 wherein the resonant type circuit comprises an auxiliary switch coupled in parallel to the primary winding such that when the auxiliary switch is turned ON the resonant tank is established.

16. The power converter of claim 15 wherein the resonant type circuit further comprises a driving circuit coupled to the auxiliary switch of the resonant tank, wherein the driving circuit is parametrically driven to turn ON and OFF the auxiliary switch by a voltage condition across the primary winding of the transformer.

17. The power converter of claim 15 wherein the auxiliary switch comprises a transistor.

18. The power converter of claim 11 wherein the capacitance ratio is 1:1.

19. The power converter of claim 11 wherein the transformer is configured to transmit the feedback signal from the secondary winding to the auxiliary winding.

20. The power converter of claim 11 wherein the switch comprises a transistor.

21. A switching mode power converter comprising:
   a. a transformer having a primary winding coupled to an input supply voltage and a secondary winding;
   b. a switch coupled in series to the primary winding;
   c. a controller coupled to the switch;
   d. a feedback circuit including an auxiliary winding magnetically coupled to the secondary winding to receive a feedback signal, wherein the feedback circuit is coupled to the controller to provide the feedback signal; and
   e. a resonant type circuit coupled to the primary winding to form a resonant tank, wherein the transformer and the resonant type circuit are configured such that the resonant tank has a characteristic impedance that dampens fluctuations in the feedback signal, further wherein the resonant type circuit further comprises a resistive element included within the resonant tank that achieves the characteristic impedance, further wherein the resonant type circuit further comprises a shape generating circuit configured to shape the feedback signal to have a back end that is substantially linear.

22. The power converter of claim 21 wherein the resistive element comprises a resistor, further wherein the resistor is coupled to a common node between the primary winding and the switch.

23. The power converter of claim 11 wherein the resonant type circuit comprises a shape generating circuit configured to shape the feedback signal to have a back end that is substantially linear.

* * * * *